Patented Feb. 9, 1943

2,310,652

UNITED STATES PATENT OFFICE 2,310,652

SOIL BUILDER

Charles Peter, Salt Lake City, Utah

No Drawing. Application December 9, 1939,
Serial No. 308,448

8 Claims. (Cl. 71—24)

This invention relates to a soil builder and to a process for preparing the same, the principal objects being:

First. To provide a soil building material in which is developed a form of bacteria useful in promoting plant growth, and heretofore entirely unknown and unrecognized.

Second. A soil building material which in addition to the newly discovered type of bacteria, contains a natural supply of so-called rare or minor elements in forms which are readily assimilated by plants, and which in turn are vital to the health and normal development of human beings using such plants as food.

Third. A soil building material in which the requisite rare or minor elements exist in balanced proportions.

Fourth. A process of preparing a soil building material from a raw natural product in which certain bacteria generated in ages of the remote past and sealed up in a dormant state, are revitalized and put into a condition where they constitute a valuable aid to modern plant growth.

Fifth. A process whereby a natural source of dormant bacteria beneficial to plant growth, and of rare or minor elements in naturally balanced proportions is rendered available for promoting plant growth by artificially revitalizing the dormant bacteria and at the same time putting the rare or minor element content in condition for absorption by plants, these two factors being harmonized to bring about mutually dependent reactions in the soil.

Advanced thinkers in the realm of agronomy recognize the fact that the intensive cropping of lands in all civilized countries of the world, is causing a dangerous depletion in the soil, of many of the mineral elements which are necessary to the healthy and normal growth of plants of all kinds. Of special concern to the human race is the threatened danger relative to plants used for food. Hardly less important is the necessity for keeping soils up to a certain standard for the production of flowers and other ornamental plants. The proper upbuilding of soils is also coming to be of great importance in the different branches of the new, so-called "chemurgic" science.

It is only of comparatively recent date that authorities have begun to realize that it is not enough to supply the usual chemical or commercial fertilizers to soils for the purpose of bringing them up to substantially their full plant-growing possibilities. Formerly it was thought that if a liberal application of the three old chemical standbys, phosphoric acid, potash and nitrogen, were given any soil, that nothing more would be necessary for success. The fallacy of this belief is shown conclusively in a great many field tests. It is my observation, that all three of these chemical substances are wasted if the physical or mechanical structure of the soil is poor. Furthermore, if there is a lack of organic matter in the soil, the use of chemical, water-soluble nitrogen carries in quantities sufficient to maintain the amount of nitrogen for crop growth, is harmful. This is also true in the use of so-called water-soluble phosphoric acid, or superphosphates, since these chemicals have a definite, reversive effect in the soil. Normal soils carry sufficient amounts of potassium, although in insoluble form. In such soils the addition of potash is unnecessary. The soil potassium can be made available if organic matter in the right proportions exists in, or is added to the soil.

Thus, it is of the greatest importance that attention be given not only to furnishing "food" for the soil, but also to see that the food furnished, shall be properly digested by the soil so as to give plants the maximum benefit of such food.

It is my contention that when the bacteria which I have found to be normally dormant in coal, are revitalized by proper processing of the coal, a most important factor in the production of food for the human race is brought into activity. This same processing makes available as a complement to the revitalized bacterial content in my soil builder, the minor or rare elements hereinbefore referred to. Such elements include prominently, titanium, molybdenum, chromium, nickel, lithium, scandium, tin, boron, beryllium, cadmium, and others to a lesser extent. The assimilation of these elements by plants, I have reason to believe, is greatly influenced by the aforesaid revitalized bacteria.

My research as to the presence of useful bacteria in coal has been checked and verified by the Columbus Laboratories of Chicago, in numerous tests, and the presence of rare metal or minor elements, has been checked and verified by the Massachusetts Institute of Technology.

The bacteria contained in coal is a type which is radically different from any classified in modern bacteriological science, and has been proven in numerous tests to be favorable to plant growth. In order to designate this newly discovered bacteria, it has been called "bacillus petronicus."

The exact composition of my soil builder depends somewhat upon the nature of the soil to which it is to be applied. In many instances it is sufficient that the coal and mill tailings alone, properly prepared, be used, while in other cases, phosphate rock as well as lime and salt and ammonium salts may be advantageously combined with the coal and mill tailings.

Many different kinds of coal may be used, for example, cannel, lignite, sub-bituminous, but not anthracite. Various bituminous substances such as natural asphalts and rock asphalts, also contain dormant bacteria which may be revitalized and rendered useful in promoting plant growth. The degree of heat applied varies with the different kinds of coal or other bitumens as well as with the different localities from which the raw material is taken. Advantageous temperatures ordinarily vary from 250 to 310 degrees Fahrenheit, depending on the class of coal used, but lower temperatures may also be used if the circumstances warrant, for example, the younger lignite coals require considerably less heat for the revitalization of their dormant bacteria than do the older bituminous coals for theirs. As a result of many experiments and tests I have found that the temperatures required to bring about the revitalization of the bacteria dormant therein, may sometimes even go as low as 125 degrees Fahrenheit, or thereabout.

In practicing the invention, an advantageous procedure is to grind the coal or other carbonaceous or bituminous material to between minus 40 and minus 75 mesh, and to form the same into a bed having a depth of from 8 to 12 inches. This bed may be formed in a suitable container, for example, an iron pan having an open top and whose sides are somewhat higher than the depth of the bed so as to accommodate the "sweating blanket" presently to be described.

The bed of coal or other bituminous substance is advantageously heat-treated by superposing thereon a layer or stratum of suitably prepared material which imparts to the coal a sweating effect. The sweating is continued for a suitable period of time, usually 8 to 10 minutes, during which period the superposed mass advantageously is of a semi-liquid or "soupy" consistency. After the required period of time has passed, the bed of finely divided coal and its superposed soupy stratum are thoroughly stirred by raking or rabbling, and this continues advantageously for another period of from 8 to 10 minutes.

The soupy layer or stratum virtually forms a "sweating blanket" and consists advantageously of mill tailings either alone or incorporated with other fundamental substances. The mill tailings result from the milling or refining of metallic or non-metallic ores, and complement the rare or mineral element content of the coal. The tailings are selected with reference to their peculiar composition and fitness for a particular soil builder.

As an example of the general nature of mill tailings, a chemical analysis of a particular specimen is submitted as follows:

| | Per cent |
|---|---|
| Copper | 0.08 |
| Iron | 1.60 |
| Sulphur | .63 |
| Aluminum | 17.19 |
| Lime | 0.73 |
| Magnesium | 2.00 |
| Silica | 68.56 |
| Sodium | 4.05 |
| Potassium ($K_2O$) | 3.80 |
| Phosphate ($P_2O_5$) | 0.27 |
| Gold | 0.0019 |
| Silver | 0.0146 |

Traces of titanium, molybdenum, chromium, nickel, lithium, scandium, tin and gallium.

The submission of the foregoing analysis is illustrative, but is not to be taken as limiting either the exact constituents of the mill tailings or the relative proportions of such constituents.

The mill tailings are ground to a suitable size, for example, from minus 60 to minus 100 mesh, and an advantageous combination is with phosphate rock ground to approximately minus 150 mesh and rock salt ground to approximately minus 50 mesh. These ingredients are advantageously used in various proportions, a prominent example being 200 parts mill tailings, 800 parts ground phosphate rock and from 100 to 200 parts ground rock salt. The bed of ground coal or other similar material with which these ingredients are combined, consists relatively of approximately 700 parts.

After completion of the sweating stage as hereinbefore specified, the mass from the rabbling pan is run into a preliminary mixer and cooler, where suitable proportions of certain fertilizing ingredients, such as ammonium sulphate, Chilean nitrate and/or potash, may be advantageously added according to specifications prescribed in individual cases. Finally, the assembled ingredients from the preliminary mixer are transferred into a principal mixer where the ingredients are intimately incorporated one with another, after which the finished soil builder is sacked or otherwise packed for the market.

In the heat-treatment of the coal or equivalent material as hereinbefore touched upon, the blanket mass before being superposed on the coal, is heated to from 800 to 1200 degrees Fahr., which brings about the soupy consistency thereof. In applying the sweating blanket, the relative heat conditions are carefully checked to see that the proper temperature limits required to bring about the bacterial revitalization specified, are maintained.

In using the soil builder, it may be broadcast over the ground to be planted, and be raked or harrowed into the ground, or it may be drilled in with the seed. For growing plants it may be applied as a side dressing or a top dressing, and should be wetted after it is applied.

Since the action of the soil builder is extremely mild, there is no necessity to guard against a too heavy application, and there is no tendency to be harmful to growing plants at any time.

The large spore bearing rod which typifies the revitalized bacteria, is particularly active in digesting complex organic substances in the soil, and is superior to cocci because of its larger working surface to create strongly acid reactions. These reactions seem distinctly antagonistic to disease-producing germs tending to invade plant life. I have observed this with particular reference to nematode infestation.

It should be noted that the revitalized bacteria are characterized by the following description: spore-bearing, Gram-negative, non-motile, anaerobic rod.

Laboratory experiments prove that the revitalized bacteria propagate at an increased rate in an environment of comminuted coal, as well as in comminuted phosphate rock, when processed as herein specified.

The herein described bacteria are extremely valuable as ammonifiers, but the resulting ammonification is never excessive.

It is to be understood that the sweating blanket herein specified, advantageously is of appreciable depth, also, that while rock salt is specifically mentioned and is preferred because of its peculiar composition, yet sodium chloride in other forms might be substituted for the rock salt.

The present application is a continuation in part of one filed by me June 18, 1937, Serial No. 148,956.

Having fully described my invention what I claim is:

1. The process of revitalizing bacteria present in and normally dormant in a freshly mined bituminous substance, comprising heating the bituminous substance to 310 degrees Fahr. or less, but not to less than approximately 125 degrees Fahr., and continuing the appplication of heat at a temperature not exceeding 310° F. for a length of time only sufficient to activate spore-bearing, Gram-negative, non-motile, anaerobic rod bacteria which were formerly in a dormant state.

2. The process of revitalizing a bacterial organism developed in ages past and which is normally present in and normally dormant in freshly mined coal, comprising heating the coal to a temperature between approximately 125 degrees Fahr., and 310 degrees Fahr.. and continuing the application of heat at a temperature not exceeding 310° F. for a length of time only sufficient to activate spore-bearing, Grame-negative, non-motile, anaerobic rod bacteria which were formerly in a dormant state.

3. Revitalizing bacteria dormant normally in freshly mined coal, comprising bedding the raw coal, applying a sweating blanket to the bedded coal at a temperature of from 800 to 1200 degrees Fahrenheit, maintaining the said sweating blanket for the time required to transform the dormant bacteria into an active, spore-bearing, Gram-negative, non-motile anaerobic rod.

4. Revitalizing bacteria of a kind dormant in freshly mined, raw bituminous matter, and maintaining the revitalized condition of the said bacteria, comprising dividing finely the said bituminous matter, bedding the finely divided bituminous matter, superposing a sweating blanket on the bedded, finely divided bituminous matter, the said sweating blanket being composed of mill tailings having a temperature of from 800 to 1200 degrees Fahrenheit at the time of being so superposed, maintaining the superposed sweating blanket on the bedded coal for the time-period required to cause the vitalization of at least the major portion of the dormant bacteria, incorporating the material of the sweating blanket with the finely divided bituminous matter at the expiration of the said time-period and cooling the mass to the normal atmospheric temperature.

5. Preparing a soil builder, comprising dividing bituminous material into fine particles, bedding the finely divided material, heating mill tailings to a temperature of from 800 to 1200 degrees Fahrenheit, blanketing the bedded bituminous material with the heated mill tailings, and incorporating the mill tailings while hot with the bedded bituminous material.

6. Preparing a soil builder, comprising bedding finely divided bituminous material, mixing mill tailings with finely divided phosphate rock, heating the mixture of mill tailings and phosphate rock to a temperature of from 800 to 1200 degrees Fahrenheit, superposing a layer of the said mixture while hot, upon the said bedded material, and incorporating the said hot mixture with the said bedded bituminous material.

7. A soil builder comprising bituminous material prepared according to the process of claim 1 and containing a considerable number of vital and active, spore-bearing, Gram-negative, non-motile, anaerobic rod bacteria of a kind normally found dormant in freshly mined bituminous substance, said soil builder, when added to soil, digesting complex organic substances therein and creating strongly acid reactions which are antagonistic to disease-producing germs which tend to invade plant life.

8. A soil builder comprising finely divided coal prepared according to the process of claim 2 containing a considerable number of vital and active spore-bearing, Gram negative, non-motile, anaerobic rod bacteria of a kind normally found dormant in freshly mined, raw coal, said soil builder, when added to soil, digesting complex organic substances therein and creating strongly acid reactions which are antagonistic to disease-producing germs which tend to invade plant life.

CHARLES PETER.